United States Patent [19]

Ogata

[11] Patent Number: 5,535,639
[45] Date of Patent: Jul. 16, 1996

[54] ACCELERATION DETECTOR

[75] Inventor: Yoshihisa Ogata, Obu, Japan

[73] Assignee: Nippondenso Co., Ltd., Kariya, Japan

[21] Appl. No.: 405,691

[22] Filed: Mar. 17, 1995

[30] Foreign Application Priority Data

Apr. 8, 1994 [JP] Japan ................................ 6-70729
Dec. 27, 1994 [JP] Japan ................................ 6-324886

[51] Int. Cl.⁶ ........................................... G01P 15/135
[52] U.S. Cl. ..................... 73/514.16; 200/61.45 R; 200/61.52
[58] Field of Search ............... 73/514.01, 514.16, 73/514.35; 200/61.45 R, 61.48, 61.52

[56] References Cited

U.S. PATENT DOCUMENTS

| 3,518,385 | 10/1968 | Boudes et al. | 200/61.45 R |
| 3,899,649 | 8/1975 | Jenkins | 200/61.45 R |
| 4,255,629 | 3/1981 | Bell | 200/61.45 R |
| 4,789,762 | 12/1988 | Miller et al. | 200/61.45 R |
| 5,391,845 | 2/1995 | Haas et al. | 200/61.52 |

FOREIGN PATENT DOCUMENTS

| 49-92274 | 11/1947 | Japan . |
| 5208658 | 8/1993 | Japan . |

*Primary Examiner*—John E. Chapman
*Attorney, Agent, or Firm*—Cushman, Darby & Cushman

[57] ABSTRACT

An acceleration detector in which detecting accuracy of acceleration is improved and unnecessary sound of operations can be prevented is disclosed. A leaf spring contacts a movable body even before it moves and, by having fixed elasticity, the leaf spring restricts the tilt of the movable body until fixed acceleration acts on it. When fixed acceleration acts on the movable body, it tilts to a fixed position against a biasing force of the leaf spring and the leaf spring and another leaf spring close to produce an acceleration detection signal.

18 Claims, 5 Drawing Sheets

ACCELERATION DETECTOR

BACKGROUND OF THE INVENTION

1. Field of the Invention

The present invention relates to an acceleration detector which can detect a collision of vehicle so that an air bag device, a door lock release device or a fuel-cut device can be operated and which can detect acceleration which acts on a vehicle so that suspension of the vehicle can be controlled.

2. Related Art

In this type of device, a pendulum type acceleration detector is known in Japanese Utility Model Laid-open No. 49-92274 in the past. In this prior art, when acceleration acts on a movable body, the movable body rocks and one end of a micro-switch installed thereabove is raised by rocking.

However, in the prior art, a fixed clearance exists between the movable body and the micro-switch and the movable body can rock freely in response to acceleration which acts thereon. Since a clearance exists between the movable body and the micro-switch, the movable body contacts with a leaf spring in a wide range in accordance with the direction of acting acceleration. If a contact position of the movable body and the leaf spring changes in a wide range, a reaction force by the leaf spring restricting the rock of the movable body also changes. Therefore, dispersion of the force necessary to operate the micro-switch becomes large and an acceleration level at which the acceleration detector operates becomes unstable.

Since the movable body can rock freely in response to acceleration acting thereon, even if acceleration smaller than the necessary acceleration to operate the micro-switch acts, the movable body rocks and unnecessary sound and abrasion of the movable body are produced. Moreover, in the prior art, since the movable body is composed of a pendulum and a flange which supports the pendulum, structure of the movable body becomes complicated.

SUMMARY OF THE INVENTION

In view of the foregoing, it is an object of the invention to provide an acceleration detector which is simple in structure of a movable portion, which can detect acceleration accurately by stabilizing a detection level of acceleration and which can reduce unnecessary sound of operations and abrasion of the movable portion.

In order to attain the object of the invention, the acceleration detector in the present invention comprises a housing and a movable body arranged in the housing and having a base. The base is in a cylindrical member. The movable body can tilt in response to horizontal acceleration with a fulcrum on an outer circumference thereof. A restriction member contacting the movable body is provided to restrict the movable body to tilt until horizontal acceleration acting on the movable body exceeds a fixed level. A switch is provided so that a contact thereof is closed by a tilt of the movable body when the fixed level of acceleration acts on the movable body and the movable body tilts until a fixed angle.

In the acceleration detector as constructed above, since the tilt of the movable body is restricted even before it moves, the movable body does not tilt if acceleration acting on the movable body has less than the fixed level and unnecessary sound of operations and abrasion of the movable portion can be prevented.

Since the restriction member contacts the movable body before it moves, a contact range of the movable body and the restriction member is made extremely narrow and dispersion of acceleration necessary to operate the switch member is not produced. Therefore, the detection level of acceleration can be stabilized so that acceleration can be detected accurately. Moreover, by making the movable portion into the cylindrical shape, the structure of the movable portion can be simplified.

DETAILED DESCRIPTION OF THE EMBODIMENTS

Figure 1:
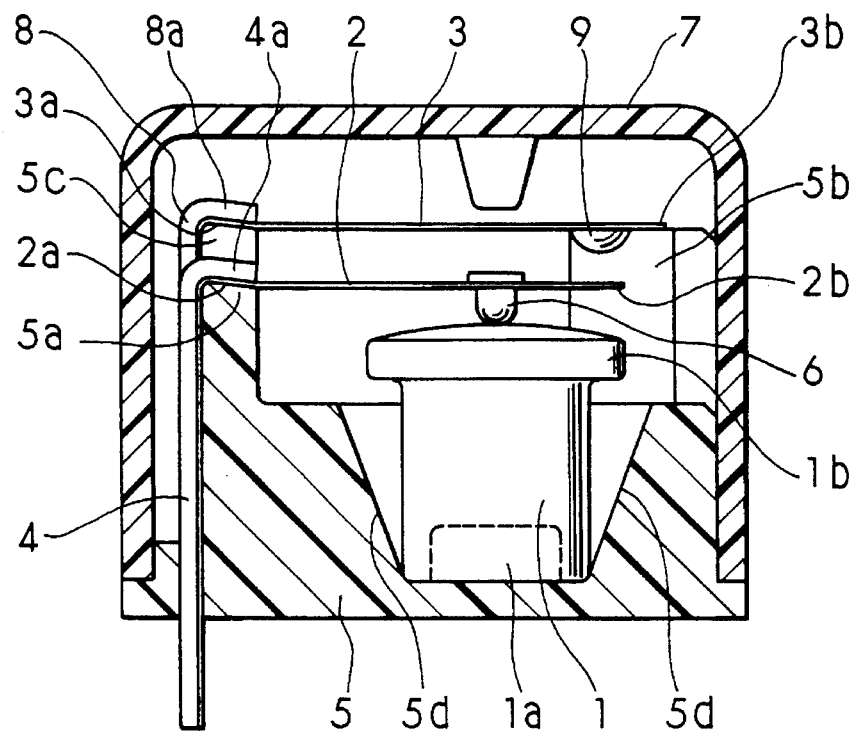
FIG. 1 is a sectional view illustrating a structure of the first embodiment in the present invention.

The first embodiment of the present invention will be explained referring to the drawings.

Figure 2:
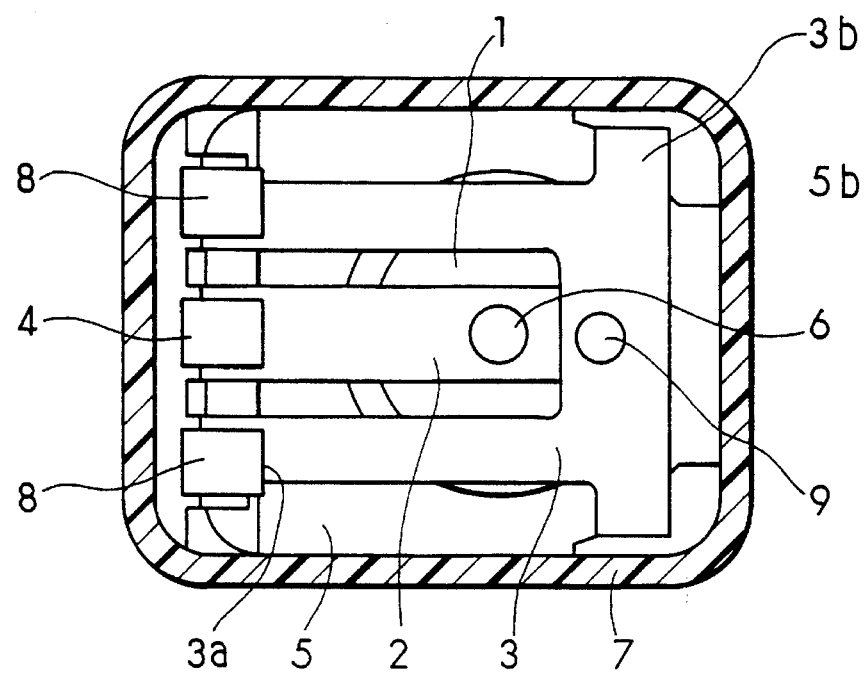
FIG. 2 is a plan view illustrating a structure of the first embodiment.

In FIGS. 1 and 2, movable body 1 as a mass weight portion has a base formed as a round cylindrical member and is installed at a fixed position in housing 5. Opening portion 1a is made in the base bottom of the cylindrical member and enlarged diameter portion 1b larger in diameter than the cylindrical member of movable body 1 is made at around a top end. Opening portion 1a and enlarged diameter portion 1b are designed for locating the center of gravity of movable body 1 on a point at least higher than the middle of the vertical height. Thus, movable body 1 can tilt even if acceleration with a low level acts on movable body 1. That is, opening portion 1a and enlarged diameter portion 1b have a function as adjusting means controlling sensitivity of an acceleration detector in the embodiment. In the embodiment, although enlarged diameter portion 1b and movable body 1 already attached together are made of the same material integrally, they may be made of different members and be attached together later on.

The upper surface of enlarged diameter portion 1b is made into a spherical shape. Tip 6 always contacts the spherical surface of enlarged diameter portion 1b. Tip 6 is fixed to leaf spring 2 of an elastic material as restriction means restricting the movement of movable body 1. Thus, movable body 1 is pressed by the biasing force produced by leaf spring 2, thus the movement of the movable body 1 is restricted. The contact surface of tip 6 to enlarged diameter portion 1b is made into the same spherical shape as the top surface of enlarged diameter portion 1b, and thereby abrasion at both contact surfaces can be reduced.

While leaf spring 2 fixing tip 6 thereon is bent at a right angle in order to protrude at one end thereof from housing 5, leaf spring 2 together with plate 4 is fixed to housing 5 by fixing means such as caulking or adhesive. One end portion 2a at a plate portion of leaf spring 2 fixing tip 6 thereon is held between inclined holding portion 5a of housing 5 and inclined bent portion 4a of plate 4. Holding portion 5a and bent portion 4a of plate 4 tilt toward movable body 1 against the horizontal direction. Thus, when the top surface of tip 6 contacts the top surface of enlarged diameter portion 1b, leaf spring 2 bends at the plate portion and movable body 1 is biased in the downward direction through tip 6 according to the degree of bending.

Holding portion 5a is fixed in housing 5 so that the movable body 1 is biased by an elastic force of the plate portion of leaf spring 2. That is because if movable body 1 is biased by an elastic force of the bent portion of leaf spring 2, loss of bend accuracy is produced by warp and stress when the leaf spring 2 is bent and biasing force biasing movable body 1 becomes different from detector to detector. Thus, detection acceleration levels are likely to differ from detector to detector. However, if movable body 1 is biased by an elastic force of the plate portion of leaf spring 2, the biasing force can be stabilized and the problem mentioned before will not occur.

As shown in FIG. 1, leaf spring 3 is installed over leaf spring 2. Leaf spring 3, like leaf spring 2, is fixed by fixing means like caulking or adhesive and one end portion 3a on the plate portion is inserted between bent portion 8a of plate 8 and holding portion 5c of housing 5. Holding portion 5c and bent portion 8a are formed with slopes just like holding portion 5a and bent portion 4a. On the other hand, the other end portion 3b of the plate portion of leaf spring 3 is engaged with engagement portion 5b of housing 5 with the plate portion of leaf spring 3 being bent. Therefore, when leaf spring 2 contacts leaf spring 3, elastic force obtained by bending of the plate portion of leaf spring 3 acts as contact weight and a stable contact is obtained. To obtain a good contact, projection portion 9 on a spherical surface contacting leaf spring 2 is fixed to the other end portion 3a of leaf spring 3.

As shown in FIG. 2, leaf spring 3 is arranged over both sides of leaf spring 2 and is connected with the other end portion 3a of the plate portion. Leaf spring 3 is shaped as shown in FIG. 2 so that balance when leaf spring 3 contacts leaf spring 2 is taken into account. However, leaf spring 3 can have only one bar instead of two bars over leaf spring 2. Leaf springs 2 and 3 installed as mentioned above become switch means which close the contact when movable body 1 tilts. Leaf springs 2 and 3 are made of an electrically conductive member to detect contacting therebetween by an electric signal generated on one ends of leaf springs 2 and 3 which are projected to the outside of housing 5, that is, leaf springs 2 and 3 can detect that acceleration exceeding a fixed level acts on movable body 1.

Figure 6:
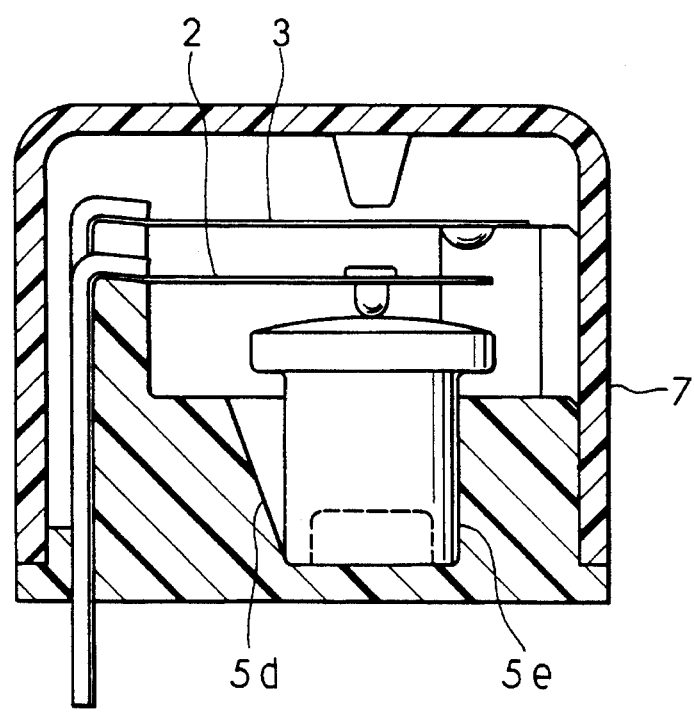
FIG. 6 is a sectional view illustrating another modified structure of the first embodiment.

Housing 5 as mentioned above is made into a shape which can hold movable body 1 and leaf springs 2 and 3. Housing 5 is formed uniformly with a resin non-conductive member. Cover 7 is fitted to housing 5 and fixed with deposition or adhesive and protects movable body 1 and leaf springs 2 and 3. Housing 5 is made into a shape such that movable body 1 can tilt by acceleration in the horizontal direction and a fixed conical shaped clearance or space having an inclined surface 5d is made around movable body 1. However, as shown in FIG. 6, by having the space with a vertical surface 5e only in a fixed direction, the detecting direction of acceleration can be limited arbitrarily. Therefore, for example, an acceleration detector having one-way detecting direction which detects acceleration in the front and the rear direction of a vehicle can be made. As shown in FIG. 1, the space is expanded gradually from the base of movable body 1 so that movable body 1 can be easily mounted in housing 5 and the base of movable body 1 is prevented from sliding on the supporting surface of housing 5 where the diameters thereof are made equal to each other.

The assembly process of the embodiment will be briefly explained. Movable body 1 is installed in housing 5 and leaf springs 2 and 3 to which tip 6 and projection portion 9 are fixed are inserted into housing 5 together with plates 4 and 8. Finally, assembling the acceleration detector of the embodiment is finished with fixing cover 7 to housing 5. Thus, in the acceleration detector in the embodiment, since every member can be assembled from one direction (from top to bottom in FIG. 1), the assembly process is simplified and can be automated easily.

Figure 3:
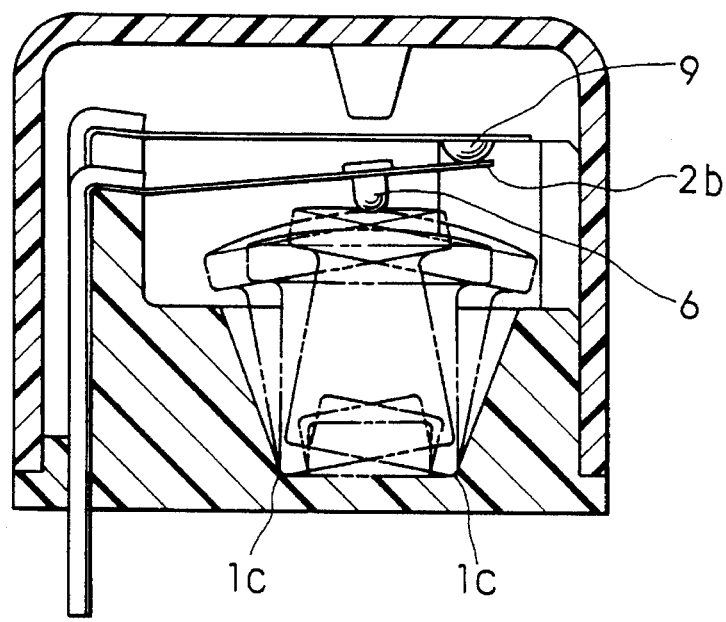
FIG. 3 is an operational view illustrating an operation of the first embodiment.

Next, the acceleration detecting operation will be explained with reference to FIG. 3.

If movable body 1 is subjected to acceleration in the horizontal direction, the force which tilts movable body 1 with a fulcrum 1c on the circumference on the base of movable body 1 is produced. If the force becomes larger than the weight of leaf spring 2 pressing enlarged diameter portion 1b of movable body 1, movable body 1 starts tilting and leaf spring 2 is raised by enlarged diameter portion 1b. Then, the free end portion 2b of leaf spring 2 contacts projection portion 9. Thus, since the contact of leaf springs 2 and 3 as switch means is closed, the electric circuit formed by leaf springs 2 and 3 is closed and acceleration exceeding the fixed level can be detected.

Since tip 6 is fixed to leaf spring 2, biasing force by leaf spring 2 is transmitted to movable body 1 through tip 6. Thus, regardless of the tilt direction of movable body 1, when leaf spring 2 contacts with leaf spring 3, the same amount of biasing force always acts on movable body 1. Therefore, the level of acceleration detected can be almost fixed regardless of the direction of acceleration. However, when tip 6 is fixed on movable body 1, tip 6 slides on the bottom surface of leaf spring 2 and the distance that leaf spring 2 is raised changes depending on the tilt direction of movable body 1. Therefore, biasing force acting on movable body 1 by leaf spring 2 cannot be kept contact and loss of acceleration detecting characteristics is caused depending on the direction of acceleration.

An air bag device, a door lock release device or a fuel-cut device can be operated by giving the switch closure signal from the electric circuit in the manner known well in the art.

In the embodiment, threshold acceleration level detected is defined by the following equation.

Equation 1:

Moveable force $[M \times Gth \times L2 \times (L1/L2)] =$

-continued

Biasing force $[F \times L2 \times (R/L2)]$ + Gravity $[M \times L2 \times (R/L2)]$ M: weight of the movable body
F: weight acting on the enlarged diameter portion $1b$
R: radius of the base of the movable body
L1: distance from the base of the movable body to the center of gravity of the movable body
L2: $(R^2+L1^2)^{1/2+1}$
Gth: threshold of acceleration at which the movable body portion starts tilting Therefore, threshold Gth of acceleration at which movable body 1 starts tilting is defined as follows.

Equation 2:

$$Gth=[(F+M)/M]\times R/L1$$

Figure 4:
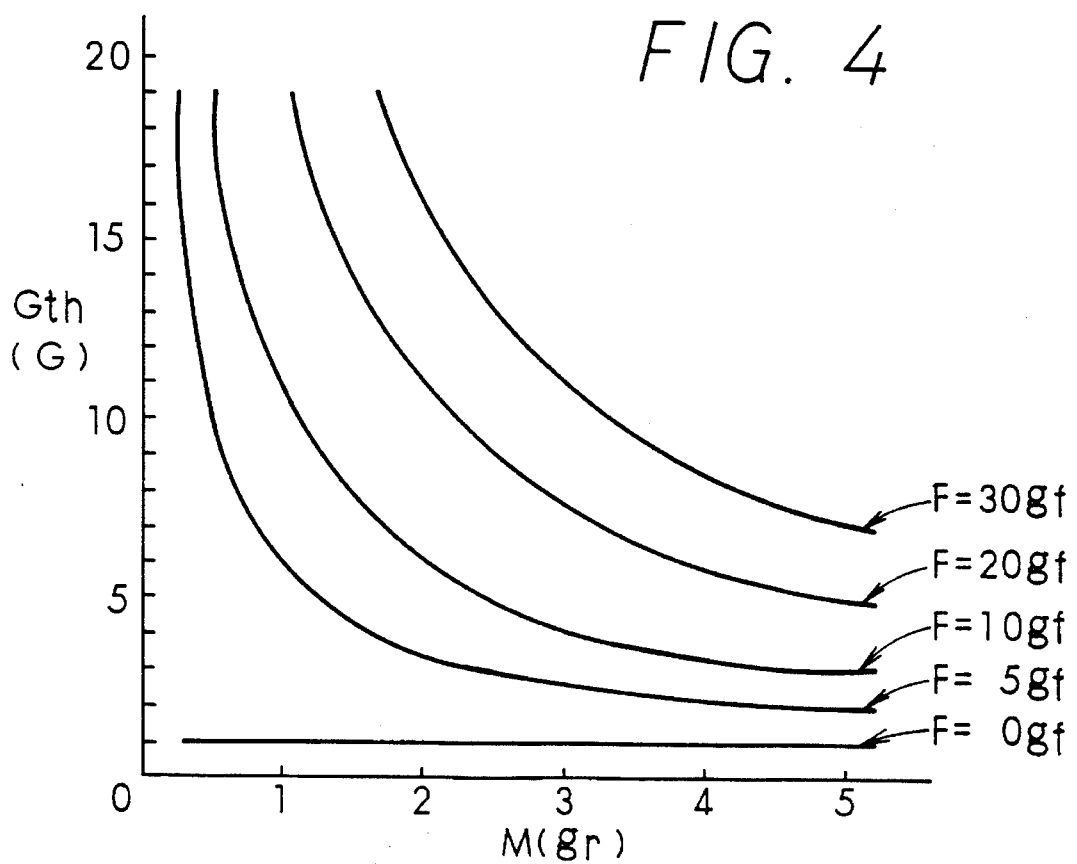
FIG. 4 is a characteristic diagram illustrating characteristics of a weight applied on an enlarged diameter portion and a threshold of acceleration with which a movable body starts.

In FIG. 4, assuming R/L1=1 in equation 2, a relation (Gth characteristics) between Gth and M is shown by having F as a parameter. Also, as shown in FIG. 4, by changing weight F acting on enlarged diameter portion $1b$ of movable body 1, relatively large acceleration above the threshold Gth of more than 10G to 20G can be easily detected in a wide range. Also, by changing the value of R/L1, Gth can be changed. However, since it exceeds the practical limit of the size of the movable body, the adjustable range becomes small.

In the embodiment, by changing the mass weight of movable body 1, characteristics of the leaf spring and ratios of the location of the center of gravity of movable body 1 and the radius of the base, setting the operation threshold level can be made in a wide range and the adjustment is made easily. If the position of the center of gravity is made higher and the radius of the base is made smaller, sensitivity in the vertical direction will become lower than that in the horizontal direction and become more insensitive against acceleration in the vertical direction.

In the embodiment, when movable body 1 returns to the horizontal position from tilting, holding time of a long switch contact is obtained since the fulcrum position moves along the circumference of the base. If acting acceleration is less than the fixed level, movable body 1 cannot move freely by leaf spring 2, unnecessary sound of operations and abrasion of friction are not caused and the reliability is improved. Further, since leaf spring 2 is used as an electrical circuit and also as restriction means restricting the movement of movable body 1 and the contact portion in the electric circuit, the number of component parts is reduced and the assembly is simplified. Therefore, low cost and small size construction can be obtained.

Figure 5:
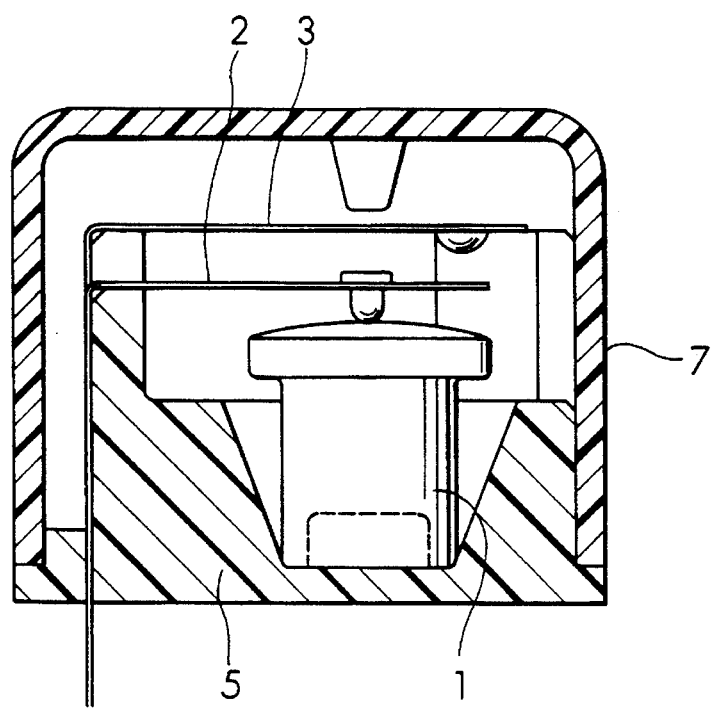
FIG. 5 is a sectional view illustrating a modified structure of the first embodiment.

The embodiment of the present invention should not be limited but can be modified and carried out by without departing from the feature of the invention. For example, in the first embodiment, as shown in FIG. 5, the plates 4 and 8 fixing leaf springs 2 and 3 can be removed. In this case, leaf springs 2 and 3 can be inserted into housing 5, insert-formed or fixed by an adhesive with housing 5. In such structure, since the plates can be removed, the structure can be simplified and the cost can be reduced.

The second embodiment of the present invention will be explained next, particularly with regard to differences from the first embodiment.

Figure 7:
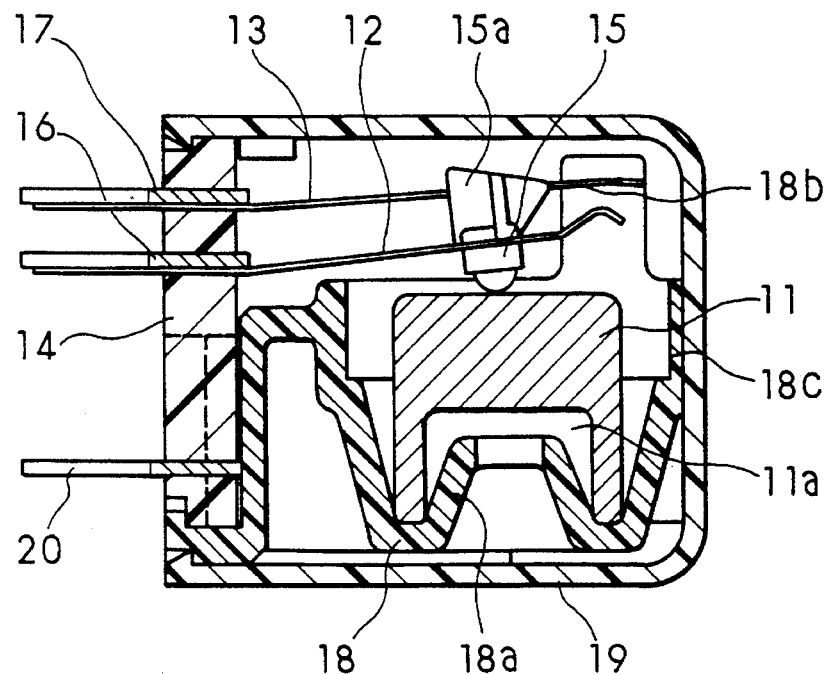
FIG. 7 is a sectional view illustrating a structure of the second embodiment in the present invention.

In FIG. 7, movable body 11 is made to have a flat top end surface by forging or cutting copper and is coated with nickel (Ni) thereon. Movable body 11 is coated with nickel so that the friction between tip 15 and movable body 11 can be reduced. Thus, abrasion of both members can be reduced, corrosion resistance can be improved and detector characteristics can be stabilized.

Figure 8:
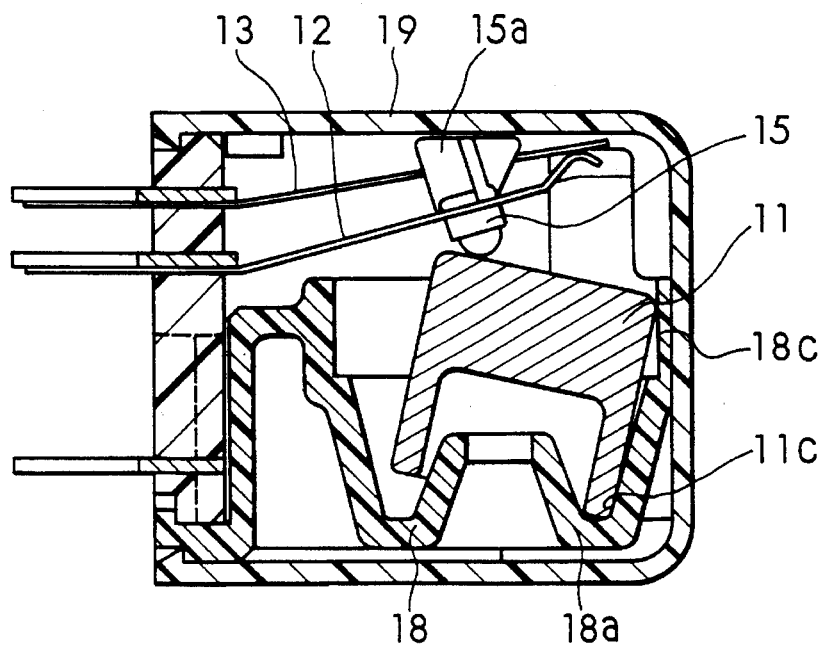
FIG. 8 is an operational view illustrating an operation of the second embodiment.

An opening or space potion $11a$ is made in the lower portion of movable body 11 just like in the first embodiment. However, in the second embodiment, convex portion $18a$ is provided in housing 18 at the position where the opening $11a$ locates in housing 18. As shown in FIG. 8, when movable body 11 tilts, the sliding motion of the outer circumference of the base portion as the tilt fulcrum $11c$ is restricted by the convex portion $18a$ and movable body 11 can be returned to the original position. Tip 15 always contacting movable body 11 is fixed by the outsert forming and restriction portion $15a$ restricting more than the fixed value of bending displacement of leaf spring 12 is formed at tip 15. Thus, as shown in FIG. 8, when movable body 11 largely tilts or when movable body 11 bounds by receiving acceleration in an up-and-down direction, the upper portion of restriction portion $15a$ contacts cover 19 and restricts further bending displacement of leaf spring 12. Therefore, fatigue of leaf spring 12 can be prevented and stability of detector characteristics can be improved.

Figure 12:
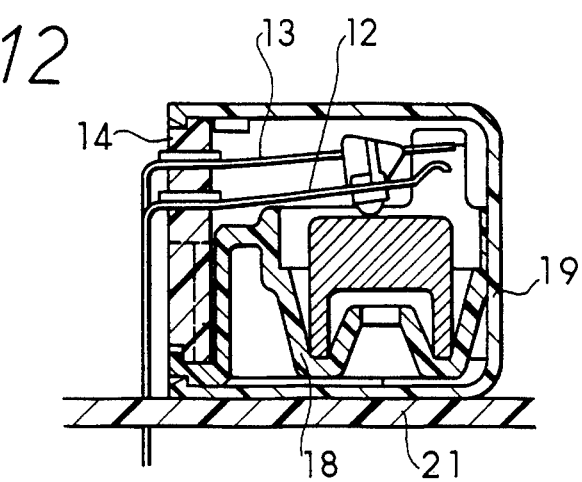
FIG. 12 is a sectional view illustrating another modified structure of the second embodiment.

Like in the first embodiment, leaf spring 12 fixing tip 15 thereon has a role as restriction means restricting the movement of movable body 11. Leaf spring 12 with leaf spring 13 also has a role as a conductive circuit including the contact of an electric circuit and a contact terminal. Leaf springs 12 and 13 together with plates 16 and 17 are fixed by an insert forming in a flat plate form at resin base 14 of the side surface of movable body 11. Plates 16 and 17 are fixed to leaf springs 12 and 13 by caulking or adhesive and locate leaf springs 12 and 13 in the case of an insert form and prevent from deformation. Moreover, plates 16 and 17 with sub-plate 20 are used for fixing the acceleration detector. However, fixing the acceleration detector can be done without plates 16 and 17 and sub-plate 20. For example, as shown in FIG. 12, leaf springs 12 and 13 are bent along base 14 and leaf springs 12 and 13 and the base 14 of cover 19 are fixed to substrate 21 such as electric circuit board by welding or adhering. In this case, the acceleration detector can be loaded directly on substrate 21. Base 14 into which leaf springs 12 and 13 and plates 16 and 17 are inserted are fixed by forcing and inserting to housing 18. Therefore, leaf springs 12 and 13 and plates 16 and 17 can be assembled in one process and assembly operation can be simplified. Moreover, when base 14 is inserted and fixed to housing 18, the fixing positions of leaf springs 12 and 13 to base 14 are determined in order that the flat plate portions of leaf springs 12 and 13 can be bent normally. Thus, tip 15 always contacts movable body 11 with leaf spring 12 bending with a fixed angle and one end of leaf spring 13 is engaged to engagement portion $18b$ of housing 18. Thus, biasing force by leaf spring 12 to movable body 11 and contact weight by elastic force of leaf spring 13 can be determined solely by inserting position at base 14, the biasing force and the contact force can be controlled more easily and accurately than in the first embodiment.

Figure 9:
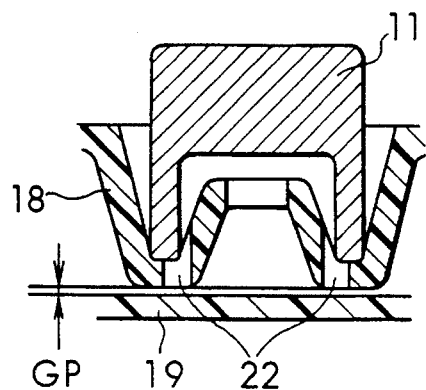
FIG. 9 is a sectional view illustrating partly a modified structure of the second embodiment.

In housing 18 holding movable body 11, as shown in FIG. 8, side surface portion $18c$ restricting the rotary motion is formed in addition to convex portion $18a$ restricting the sliding motion of movable body 11. Since an installation position of movable body 11 on housing 18 is made with a groove portion, defrosted water is collected in the groove portion of housing 18. In order for preventing movable body 11 from not tilting appropriately because of freezing of the water, drain hole 22 should be made in the groove portion as shown in FIG. 9. In this case, an interval or gap GP between housing 18 and cover 19 is determined so that water surface contacts cover 19 by surface tension and the water can be drained from drain hole 22 to the side of cover 19.

Figure 10:
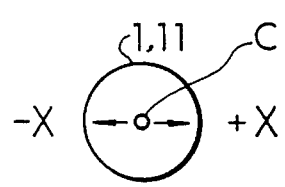
FIG. 10 is an explanation diagram explaining a contact position of a tip.
Figure 11:
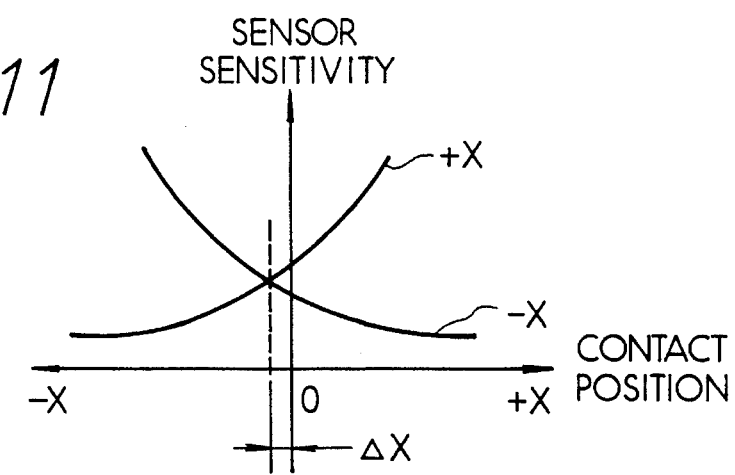
FIG. 11 is a characteristic diagram illustrating a characteristics of the detector sensitivity in the case of changing the contact position of the tip.

In the first and second embodiments, contact positions of tips 6 and 15 against movable bodies 1 and 11 are at the respective centers of movable bodies 1 and 11. However, as shown in FIG. 10, by moving the contact positions c of tips 6 and 15, i.e., position where the biasing force of leaf springs is applied, detector sensitivity in the directions opposing each other can be changed. That is, as shown in FIG. 10, if contact positions of tips 6 and 15 are moved in the −X direction, detector sensitivity becomes high against acceleration in the −X direction but low in the +X direction. Thus, by moving contact positions c of tips 6 and 15 by an amount ΔX, directional sensitivity can be set up as desired and displacement of directional sensitivity by deflection of leaf springs can be compensated for as shown in FIG. 11.

In the present invention as mentioned above, since restriction means normally contact the movable body even before it moves upon acceleration, the contact of the movable body and the restriction means is made in a narrow range and detection level of acceleration can be stabilized. Thus, detecting acceleration can be performed very accurately. If acceleration acting on the movable body is less than the fixed threshold level, undesired sound of operations can be prevented since the movable body does not tilt.

What is claimed is:

1. An acceleration detector comprising:

a housing;

a movable body installed in the housing and having a cylindrical base member, the movable body being arranged to tilt in response to acceleration in a horizontal direction with a fulcrum on an outer circumference portion of the base member;

restriction means contacting the movable body to restrict a tilt of the movable body until acceleration in the horizontal direction acting on the movable body exceeds a fixed level; and switch means arranged to be closed by tilting of the movable body when acceleration greater than the fixed level acts on the movable body and the movable body tilts to a fixed angle;

wherein the restriction means is made of an elastic member having fixed elastic force, is fixed to the housing at one end thereof, and contacts a top surface of the movable body at the other end thereof;

wherein the movable body is biased in the direction toward the base member by the elastic force; and wherein the restriction means is made of a leaf spring member as the elastic member and includes a contact member fixed to the leaf spring member to contact the movable body.

2. The acceleration detector in claim 1, wherein the movable body is so shaped as the center of gravity thereof is located higher than a middle of the height thereof.

3. The acceleration detector in claim 2, wherein the movable body has an opening portion at lower portion than the middle of the height thereof so that the center of gravity thereof becomes higher than the middle of the height thereof.

4. The acceleration detector in claim 3, wherein the housing has a convex portion at a place corresponding to the opening portion of the movable body.

5. The acceleration detector in claim 2, wherein the movable body has an enlarged diameter portion at a higher portion than the middle thereof so that the center of gravity of the movable body becomes higher than the middle of the height thereof.

6. The acceleration detector in claim 1, wherein the elastic member has a contact member fixed at the other end of the elastic member to contact the upper portion of the movable body so that biasing force by the elastic force is transmitted to the movable body therethrough.

7. The acceleration detector in claim 6, wherein the contact member has a restriction portion restricting the displacement of the elastic member by contacting an inside surface of the housing when the movable body tilts and the elastic member is displaced to a fixed position.

8. The acceleration detector in claim 1, wherein at least one of a contact surface of the contact member contacting a top surface of the movable body and a top surface of the movable body is made into a spherical shape.

9. The acceleration detector in claim 1, wherein the movable body is made of copper and at least a portion thereof contacting the contact member is coated by nickel.

10. The acceleration detector in claim 1, wherein the restriction means is composed of a leaf spring member having a plate portion fixed to the housing at one end thereof and contacting the movable body so that an elastic force acts on the movable body at the contact.

11. The acceleration detector in claim 10, wherein the one end of the plate portion of the leaf spring member is inserted into the housing at the horizontal side of the movable body.

12. The acceleration detector in claim 11, wherein the inserted position is determined so that the plate portion biases a desired spring weight to the movable body with elastic deformation when the other end of the plate portion of the leaf spring member contacts the movable body.

13. The acceleration detector in claim 1, wherein the housing has a drain hole at a bottom portion thereof for draining water from inside to outside thereof.

14. An acceleration detector comprising:

a housing;

a movable body installed in the housing and having a cylindrical base member, the movable body being arranged to tilt in response to acceleration in a horizontal direction with a fulcrum on an outer circumference portion of the base member;

restriction means contacting the movable body to restrict a tilt of the movable body until acceleration in the horizontal direction acting on the movable body exceeds a fixed level; and switch means arranged to be closed by tilting of the movable body when acceleration greater than the fixed level acts on the movable body and the movable body tilts to a fixed angle;

wherein the restriction means is made of an elastic member having fixed elastic force, is fixed to the housing at one end thereof, and contacts a top surface of the movable body at the other end thereof;

wherein the movable body is biased in the direction toward the base member by the elastic force; and wherein the restriction means has a leaf spring member having an electric conductivity as the elastic member so that, when the movable body tilts, the leaf spring member moves and contacts another conductive member of the switch means.

15. The acceleration detector in claim 14, wherein said another conductive member is formed by an elastic member in a leaf spring form.

16. The acceleration detector in claim 15, wherein a contact member is fixed to one of the leaf members at a place where the leaf spring members contact and the leaf spring members can conduct through the contact member.

17. An acceleration detector comprising:

a housing;

a movable body installed in the housing and having a cylindrical base member, the movable body being arranged to tilt in response to acceleration in a horizontal direction with a fulcrum on an outer circumference portion of the base member;

restriction means contacting the movable body to restrict a tilt of the movable body until acceleration in the horizontal direction acting on the movable body exceeds a fixed level; and switch means arranged to be closed by tilting of the movable body when acceleration greater than the fixed level acts on the movable body and the movable body tilts to a fixed angle;

wherein the restriction means includes a first conductive leaf spring member applying a biasing force to the movable body, and wherein the switch means includes a second conductive leaf spring member arranged to be contacted by the first conductive leaf spring member when the movable body tilts in response to acceleration and moves the first conductive leaf spring member against the biasing force of the first leaf spring member.

18. The acceleration detector in claim 17, wherein the housing has holding portions, and wherein first ends of the first conductive leaf spring member and the second conductive leaf spring member are fixed to the holding portions by plates having bent portions which correspond to the holding portions of the housing.

* * * * *